Patented May 25, 1948

2,442,218

UNITED STATES PATENT OFFICE 2,442,218

INTERPOLYMERS OF ISOOLEFINE WITH DI-OLEFINS AND PROCESS OF PRODUCING SAME

William J. Sparks, Elizabeth, and Robert M. Thomas, Union, N. J., assignors, by mesne assignments, to Jasco, Incorporated, a corporation of Louisiana No Drawing. Application August 27, 1941, Serial No. 408,466

8 Claims. (Cl. 260—23)

This invention relates to plastic, elastic rubbery materials, relates particularly to high molecular weight synthetic polymers of an iso-olefin, such as isobutylene, with a diolefin, having a relatively low iodine number; and relates especially to a sulfur chloride treatment of a synthetic heteropolymer of an iso-olefin with a diolefin.

It has been found possible to produce interpolymers or copolymers of iso-olefins such as isobutylene with diolefins, particularly conjugated diolefins such as butadiene or isoprene or pentadiene or dimethyl butadiene by the use of a low temperature technique at temperatures ranging from $-20$ to $-100°$ C. or lower, with a Friedel-Crafts type active metal halide catalyst such as aluminum chloride or aluminum bromide, in solution in a low freezing solvent such as ethyl or methyl chloride or carbon disulfide or other similar inert low freezing solvent for the active metal halide substance. The resultant polymer is composed of a major amount of polymerized isobutylene molecules with a minor amount of interpolymerized diolefin molecules, usually less than 5%, preferably less than 50%. The polymer is characterized by a relatively low iodine number, usually between 1 and 10, and preferably below 45, and a relatively high molecular weight, preferably above 15,000, or even above 25,000, up to about 100,000 to 150,000. This polymer is reactive with sulfur, especially in the presence of a sulfurization aid, i. e., a sulfur compound of the thiuram type such as tetra methyl thiuram disulfide or other analogous substances such as dipentamethylene thiuram tetrasulfide, selenium diethyl dithio carbamate, and zinc dibutyl dithio carbamate, etc.

The sulfurization reaction is a curing procedure having a few points of similarity to the vulcanization of rubber in that it destroys the plasticity of the material and produces in it a definite elastic limit and a definite elongation at break, the tensile strength ranging from 2,000 to 4,600 lbs./sq. in. and the elongation ranging from 500% to 1200%, although under favorable conditions the upper value of the tensile strength can be substantially increased. The curing reaction preferably occurs at temperatures ranging from 145° C. to 180° C. and preferably by the application of those temperatures for time intervals ranging from 10 minutes to 4 hours, depending upon the sulfurization aid, the character of the polymer, and the temperature.

It is now found, however, that by the procedure of the present invention, a very substantial increase in flexure resistance and abrasion resistance can be obtained, and the modulus of the material improved, and also the material is more easily cured, especially in the presence of other substances which tend to interfere with the curing of the polymer as originally produced.

The present invention consists of a treatment of the olefin polymer, in the solid form on the mill, heated, if desired, with sulfur chloride. This treatment does not cure or vulcanize the material, does not destroy its plasticity, and does not interfere with its subsequent curing operation. Accordingly, a further aspect of the invention is the combination of treatments applied to the polymer including the sulfur chloride treatment and a compounding with sulfur, a sulfurization aid, various pigments and loading agents and a subsequent curing by the application of heat into a fully cured and sulfurized material which has a markedly increased abrasion resistance, a markedly increased flexure resistance; the procedure giving a much greater ease of curing as well as the capability of curing in the presence of natural rubber and other unsaturated substances.

Thus, an object of the invention is to modify the characteristics of an iso-olefin-diolefin polymer by the application thereto of a sulfur chloride; a further object is to apply to an interpolymer of an iso-olefin with a diolefin, a sulfur chloride treatment, and subsequently a curing treatment to improve modulus, the abrasion resistance and the flexure resistance of the polymer. Other objects and details of the invention will be apparent from the following description.

The polymer material of this invention is preferably prepared by the procedure shown in the copending application Serial No. 182,252, filed December 29, 1937, in the name of William J. Sparks and Robert M. Thomas, now Patent No. 2,356,127, of which this application is a continuation in part. In outline, the procedure for preparing the polymer consists in preparing a mixture of isobutylene in the proportion of from 70 to 99 parts with a diolefin in the proportion of 30 to 1 part; suitable diolefins being butadiene, isoprene, pentadiene, dimethyl butadiene, cyclopentadiene or other conjugated diolefins. The mixture of isobutylene and conjugated diolefin is then cooled to a relatively low temperature, preferably below $-20°$ C., and preferably by the application to the mixture of a refrigerant such as solid carbon dioxide, or ethylene (which is the preferred refrigerant-diluent) or such other diluent refrigerants as liquid methane, especially in admixture with liquid propane or liquid ethane or under suitable conditions, external cooling may be used. In addition, various diluents may be used such as butane, ethyl or methyl chloride and the like. If solid carbon dioxide is used, it is preferably present in substantial excess, usually 2 or 3 times by weight of the amount of mixed olefins. If the liquid hydrocarbon refrigerant-diluents are used, they are preferably present in the proportion of from 2 to 5 volumes per volume of mixed olefins. To this mixture of olefins and diluent-refrigerant there is then added a solution of an active metal halide catalyst such as aluminum chloride, titanium chloride, or uranium chloride dissolved in an inert, low-freezing, carbonaceous solvent such as ethyl or methyl chloride or carbon disulfide or other similar low freezing, non-complex forming solvent. The catalyst solution is preferably applied to the rapidly-stirred olefin-containing mixture in the form of a fine mist or spray onto the rapidly agitated surface of the olefin containing mixture. The polymerization proceeds rapidly to yield a slurry or mass of the polymer in the residual diluent-refrigerant.

The polymerization reaction is preferably continued until from 50% to 95% of the olefins present have reacted. When this stage of reaction is reached, the reaction is desirably quenched by mixing the polymerization material with a combined-oxygen-containing substance such as an alcohol, a ketone or an acid, or an alkaline agent such as caustic or carbonate solution or ammonia or other similar quenching agent. The polymer is then preferably brought up to room temperature and washed to remove the diluent, the refrigerant, the catalyst solvent and the unreacted olefins as well as the decomposition products of the active metal halide catalyst substance. This washing is conveniently conducted in a Werner-Pfleiderer type of kneading machine, but it may be conducted in the Banbury type of mill or on the open rolls or merely by prolonged soaking in a churn or other simple washing equipment. The polymer is then preferably dried and is then ready for the next step of the present invention.

EXAMPLE I

In practicing the invention, the polymer prepared as above described is mixed in the cold with sulfur monochloride, preferably upon the open roll mill, or in the Banbury mixer or even in the Werner-Pfleiderer mixer. The material is then milled hot, that is, at a temperature of about 100° C. on a closely adjusted roll mill. During this milling considerable quantities of hydrogen chloride are evolved. The milling is preferably continued until substantially all of the hydrogen chloride is driven out, this requiring from 10 to 30 minutes of milling. The material may be cooled on the mill and then, or at a later date, it may be compounded with appropriate additional substances.

A suitable compounding formula consists of:

|  | Parts |
|---|---|
| $S_2Cl_2$ treated polymer | 100 |
| "Channel gas black" | 50 |
| Zinc oxide | 5 |
| Stearic acid | 3 |
| Sulfur | 3 |
| Tetra methyl thiuram disulfide | 1 |

This formula is conveniently prepared by incorporating the successive substances into the polymer on the open mill in a manner much like that in which rubber compounding is accomplished. The compounding may be conducted upon the hot mill up to the point of addition of the sulfurization aid, tetra methyl thiuram disulfide, but the mill is preferably cooled to a temperature well below 100° C. before the sulfurization aid is added. The completed compound is then placed in appropriate molds and cured by the application of heat, preferably a temperature of 155° C. and an interval of approximately 60 minutes. The effect of varying amounts of sulfur monochloride upon the characteristics of the polymer are shown in Table 1:

TABLE 1

Effect of quantity of $S_2Cl_2$ upon the polymer when cured with tetramethylthiuramdisulfide

| Per Cent $S_2Cl_2$ | Tensile Strength | Per Cent Elongation |
|---|---|---|
|  | Lbs./sq. in. |  |
| None | 2,000–2,400 | 700–800 |
| 4 | 1,200 | 600 |
| 8 | 1,360 | 500 |
| 12 | 1,880 | 400 |
| 16 | 2,000 | 375 |

From this table it will be observed that the treatment of the polymer material with sulfur monochloride presents a method of obtaining better efficiency in consumption of the double bonds in the sulfurization reaction.

In measuring abrasion resistance on the duPont abrader, two factors are important, i. e., the amount of loss per horse-power consumed and the character of the abraded surface. Rubber gives a smooth surface with a powdery abrasion product. The polymer material ordinarily gives a rough surface with a stringy abrasion product. The very great change in the abrasion resistance obtained is shown in Table 2:

TABLE 2

Abrasion of $S_2Cl_2$ (12%) treated iso-olefin-diolefin interpolymer on du Pont abrader

| Sample | Loading | Type of Abrasion | cc. Loss[1] |
|---|---|---|---|
|  | Per cent |  |  |
| Iso-olefin-diolefin polymer | 75 | Stringy | 150–300 |
| Rubber Tread | 50 | Smooth | 220 |
| Treated Iso-olefin-diolefin polymer | 50 | do | 134 |
| Do | 75 | do | 100 |

[1] Lower figure is superior.

It will be observed that this treatment effects a very great improvement in the abrasion resistance.

The treatment likewise very greatly modifies the modulus of elasticity, the effect upon the polymer beng to impart a higher modulus* (more perpendicular stress-strain curve) and obtain a product having approximately equivalent tensile strength.

It is obvious that no single stress-strain relationship inherent in a product would be optimum for all or even a major portion of the uses to which that product might be applied. Previous to the present invention, it was not possible to change by a substantial amount the modulus of materials of this type without a deteriorating effect on other properties. By the application of

* In the physical testing of rubber, the ratio of stress to strain, i. e., the load in lbs. per sq. inch or kilos. per sq. cm. of initial cross-sectional area necessary to produce a stated percentage-elongation is called the modulus. It is a measure of stiffness, is influenced by pigmentation, state of cure, quality of raw rubber and other factors. The modulus at any given elongation is shown by the stress-strain curve.

the present invention, it is now possible to produce modulus characteristics in conformity with the demands of a particular need and this greatly extends the range of applicability of the iso-olefin-diolefin polymers.

EXAMPLE II

In this embodiment of the invention, a portion of the low temperature polymer prepared as above described and treated on the mill with sulfur chloride was dissolved in 54° naphtha in the proportion of approximately 20%. This solution is a thick, viscous fluid which is a highly satisfactory cement for both rubber and the polymer material.

In preparing this cement, a convenient mixture consists of:

| | Parts by weight |
|---|---|
| Sulfur chloride treated isobutylene-isoprene interpolymer | 100 |
| Carbon black | 50 |
| Zinc oxide | 5 |
| Stearic acid | 3 |
| Sulfur | 1.5 |

These materials are desirably dissolved in 54° naphtha in the proportion of 1 part by weight of the polymer mixture to from 3 to 10 parts by weight of the naphtha. This composition is a highly satisfactory cement, particularly for such uses as cementing rubber articles together, cementing polymer articles together, cementing polymer articles to rubber articles and cementing either rubber or polymer articles to other materials such as metal, wood, leather, fabrics in general, and similar uses.

It will be observed that no sulfurization aid is added in the above instances to the cement. The sulfurization aid is not necessary since a sufficient amount of sulfurization aid diffuses from the tread and carcass into the cement to complete the curing; or in the case of the polymer to metal adhesion sufficient sulfurization aid diffuses from the polymer layer to cure the cement.

Alternatively, however, in some instances it is desirable to add the sulfurization aid to the cement and this is conveniently done in the proportion of approximately 1½ parts to 3 or 4 parts of the sulfurization aid per 100 parts of the polymer, if sulfur is also present, or if desired, the sulfur may be omitted, and the curing obtained entirely from the sulfurization aid.

This cement is applicable to the cementing of rubber or polymer articles to other synthetic rubbers or rubber substitutes including polybutadiene, Buna; polybutadiene acrylonitrile, Buna N; polybutadiene-styrene, Buna S; polychloroprene, neoprene; the reaction product of ethylene dichloride and sodium polysulfide, and similar substances. The cement also is strongly adherent to most of the so-called synthetic plastics including the phenol formaldehyde condensation resins, the acrylate resins and the many other similar substances.

The reactions involved in the preparation and use of this composition are as yet unknown. It is, however, known that the reaction of the polymer with sulfur chloride is greatly different from the reaction of rubber with sulfur chloride since sulfur chloride is a standard vulcanization agent for rubber and rubber when treated with sulfur chloride is completely vulcanized. This, however, is not the case with the polymer, since it still contains unsaturation which permits further curing after the sulfur chloride treatment and also the sulfur chloride treated polymer is still plastic and can still be worked on the mill; still has a considerable amount of cold flow and is capable of flowing to fill the contours of a mold upon heating, even though the sulfur chloride has been absorbed into the polymer and combined therewith.

Applicants' present opinion is that the sulfur chloride removes a portion of the hydrogen from the polymer without reducing the unsaturation. It is believed at the present time that in the preparation of the polymer a long chain molecule is obtained in which the unsaturation of all of the isobutylene molecules except a terminal molecule, disappears and in which the diolefin molecules are polymerized into the chain with the loss of one of the double bonds as shown in this formula:

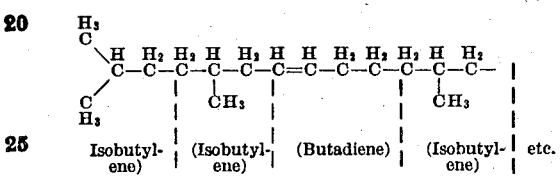

It is believed that this chain structure builds up until molecular weights of from 15,000 to 150,000 are obtained.

It is further believed that when the sulfur monochloride or sulfur dichloride treatment is applied, both the sulfur and chlorine are absorbed into the molecule by the double bonds in two different molecules as shown in the following equation:

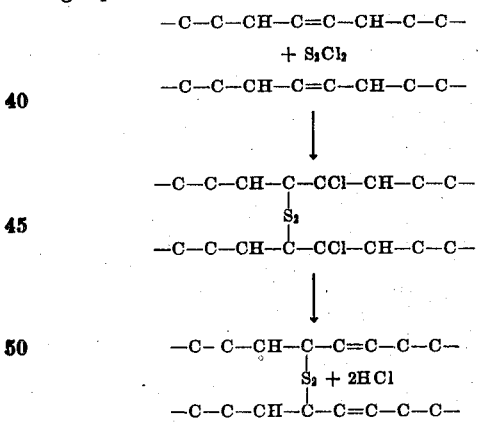

It will be observed that hydrogen chloride is eliminated by this reaction and that two of the chain molecules are linked together by a sulfur atom while retaining double bonds in each molecule in nearly the original position. It may well be that linkage by a single sulfur atom is different from the curing operation by sulfur. In any event, the material produced by this reaction is very different from the cured material. These equations are offered as a possible suggestion of the reaction and as a plausible reason for the differences obtained in the present process. They have not, however, been proved, and they are not offered as settled fact, nor is reliance placed upon them for explanation of the invention.

Thus, the invention consists of a new and useful process for improving the physical characteristics of an olefinic interpolymer by the application to a solid polymer of a substantial percentage of sulfur chloride, and the elimination of hydrogen chloride from the polymer to produce a material which is capable of being compounded, milled and thereafter cured with sulfur at an elevated temperature to produce a material having an elastic limit, a tensile strength, a high elongation, a high abrasion resistance and a high flexure resistance.

The invention claimed is:

1. In the processing of a low temperature interpolymer of a major proportion of isobutylene with a minor proportion of a conjugated diolefin, the said interpolymer having a molecular weight between about 15,000 and 150,000 and an iodine number within the range between about 1 and 45, the step of treating the polymer with a sulfur chloride, withdrawing hydrogen chloride from the treated polymer and thereafter milling the material to incorporate thereinto carbon black, zinc oxide, stearic acid, sulfur and a sulfurization aid.

2. In the processing of a low temperature interpolymer of a major proportion of isobutylene and a minor proportion of a conjugated diolefin, the said interpolymer having a molecular weight between about 15,000 and 150,000 and an iodine number within the range of between about 1 and 45, the steps of milling the polymer, and adding sulfur monochloride to the milled polymer, and thereafter withdrawing hydrogen chloride.

3. In the processing of a low temperature interpolymer of a major proportion of isobutylene with a minor proportion of butadiene, the said interpolymer having a molecular weight between about 15,000 and 150,000 and an iodine number within the range between about 1 and 45, the step of treating the polymer with a sulfur chloride, withdrawing hydrogen chloride from the treated polymer and thereafter milling the material to incorporate thereinto carbon black, zinc oxide, stearic acid, sulfur and a sulfurization aid.

4. In the processing of a low temperature interpolymer of a major proportion of isobutylene with a minor proportion of isoprene, the said interpolymer having a molecular weight between about 15,000 and 150,000 and an iodine number within the range between about 1 and 45, the step of treating the polymer with a sulfur chloride, withdrawing hydrogen chloride from the treated polymer and thereafter milling the material to incorporate thereinto carbon black, zinc oxide, stearic acid, sulfur and a sulfurization aid.

5. In the processing of a low temperature interpolymer of a major proportion of isobutylene with a minor proportion of dimethyl butadiene, the said interpolymer having a molecular weight between about 15,000 and 150,000 and an iodine number within the range between about 1 and 45, the step of treating the polymer with a sulfur chloride, withdrawing hydrogen chloride from the treated polymer and thereafter milling the material to incorporate thereinto carbon black, zinc oxide, stearic acid, sulfur and a sulfurization aid.

6. In the processing of a low temperature interpolymer of a major proportion of isobutylene with a minor proportion of butadiene, the said interpolymer having a molecular weight between about 15,000 and 150,000 and an iodine number within the range of between about 1 and 45, the steps of milling the polymer, and adding sulfur monochloride to the milled polymer, and thereafter withdrawing hydrogen chloride.

7. In the processing of a low temperature interpolymer of a major proportion of isobutylene with a minor proportion of isoprene, the said interpolymer having a molecular weight between about 15,000 and 150,000 and an iodine number within the range of between about 1 and 45, the steps of milling the polymer, and adding sulfur monochloride to the milled polymer, and thereafter withdrawing hydrogen chloride.

8. In the processing of a low temperature interpolymer of a major proportion of isobutylene with a minor proportion of dimethyl butadiene, the said interpolymer having a molecular weight between about 15,000 and 150,000 and an iodine number within the range of between about 1 and 45, the steps of milling the polymer, and adding sulfur monochloride to the milled polymer, and thereafter withdrawing hydrogen chloride.

WILLIAM J. SPARKS.
ROBERT M. THOMAS.

REFERENCES CITED

The following references are of record in the file of this patent:

UNITED STATES PATENTS

| Number | Name | Date |
|---|---|---|
| 2,023,495 | Thomas | Dec. 10, 1935 |
| 2,138,895 | Wiezevich | Dec. 6, 1938 |
| 2,142,980 | Huijser | Jan. 3, 1939 |
| 2,152,828 | Thomas | Apr. 4, 1939 |
| 2,213,423 | Wiezevich | Sept. 3, 1940 |

FOREIGN PATENTS

| Number | Country | Date |
|---|---|---|
| 6,642 | Great Britain | June 21, 1911 |
| 513,521 | Great Britain | Oct. 16, 1939 |